J. H. RAMSEY.
MECHANISM FOR TYING BAGS.
APPLICATION FILED OCT. 16, 1906. RENEWED JAN. 13, 1912.

1,116,736.

Patented Nov. 10, 1914.
4 SHEETS—SHEET 1.

WITNESSES

INVENTOR
Joseph Henry Ramsey
by Ward & Cameron
Attorneys

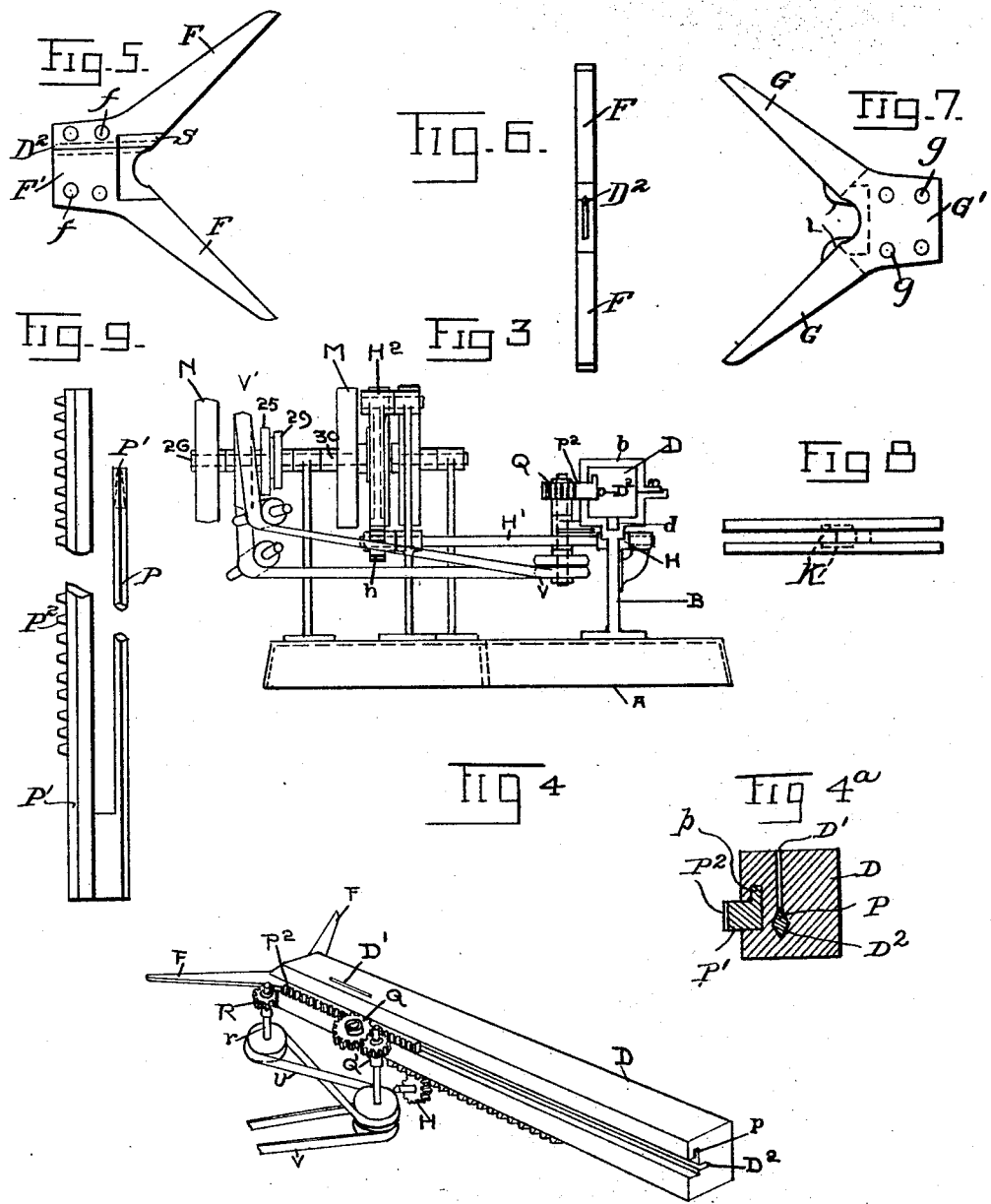

J. H. RAMSEY.
MECHANISM FOR TYING BAGS.
APPLICATION FILED OCT. 16, 1906. RENEWED JAN. 13, 1912.
1,116,736.
Patented Nov. 10, 1914.
4 SHEETS—SHEET 3.
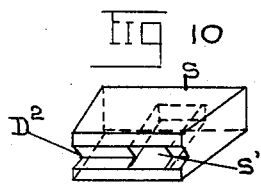
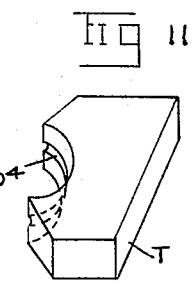
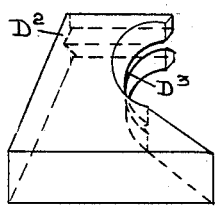
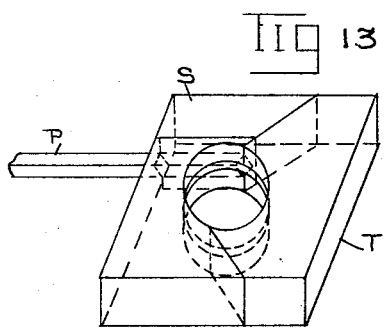
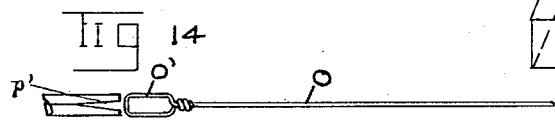
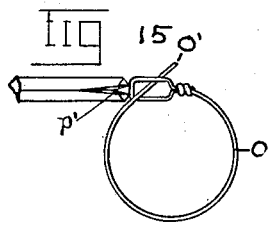
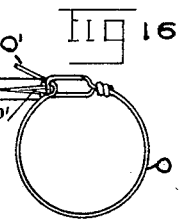
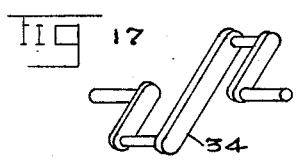
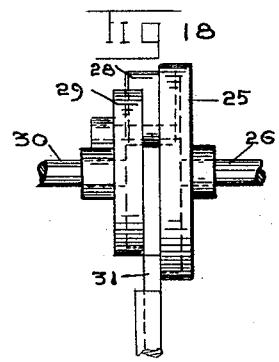
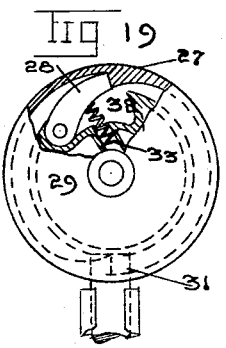
WITNESSES
INVENTOR
Joseph Henry Ramsey
by Ward Cameron
Attorneys J. H. RAMSEY.
MECHANISM FOR TYING BAGS.
APPLICATION FILED OCT. 16, 1906. RENEWED JAN. 13, 1912.
1,116,736.
Patented Nov. 10, 1914.
4 SHEETS—SHEET 4.
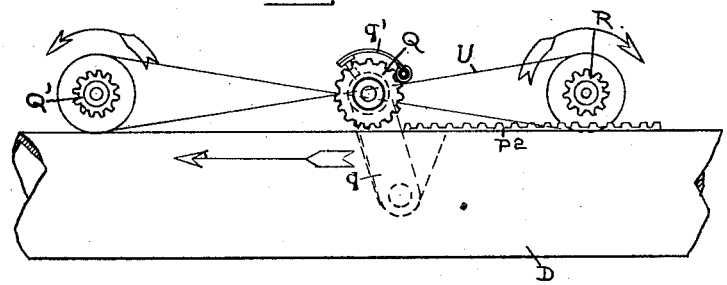
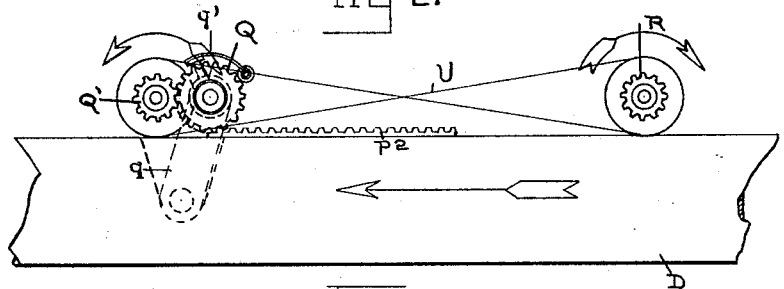
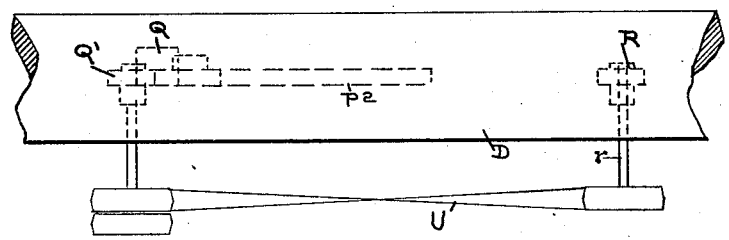
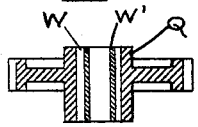
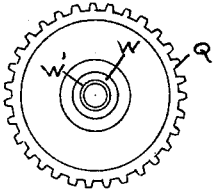
WITNESSES
INVENTOR
Joseph Henry Ramsey

UNITED STATES PATENT OFFICE.

JOSEPH HENRY RAMSEY, OF ALBANY, NEW YORK, ASSIGNOR TO THE WEIGH AND TIE COMPANY, OF ALBANY, NEW YORK, A CORPORATION OF NEW YORK.

MECHANISM FOR TYING BAGS.

1,116,736. Specification of Letters Patent. Patented Nov. 10, 1914.

Application filed October 16, 1906, Serial No. 339,215. Renewed January 13, 1912. Serial No. 671,099.

*To all whom it may concern:*

Be it known that I, JOSEPH HENRY RAMSEY, a citizen of the United States, residing at the city of Albany, in the county of Albany and State of New York, have invented certain new and useful Improvements in Mechanism for Tying Bags, of which the following is a specification.

Figure 1:
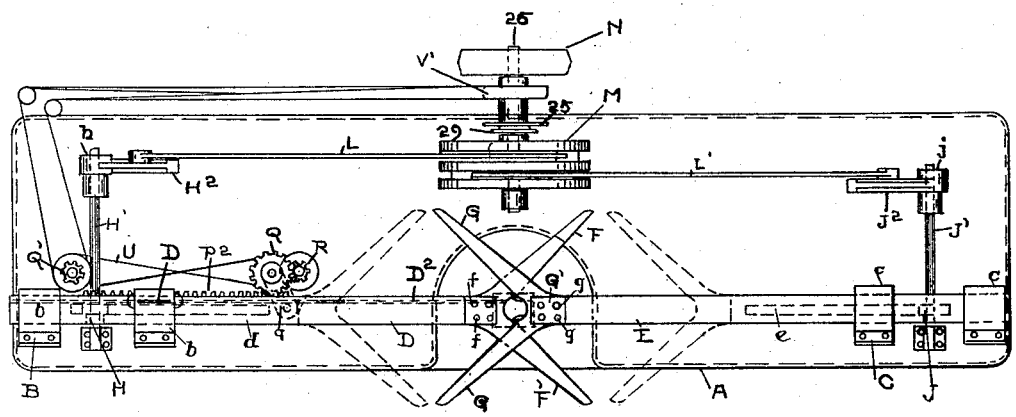
Figure 2:
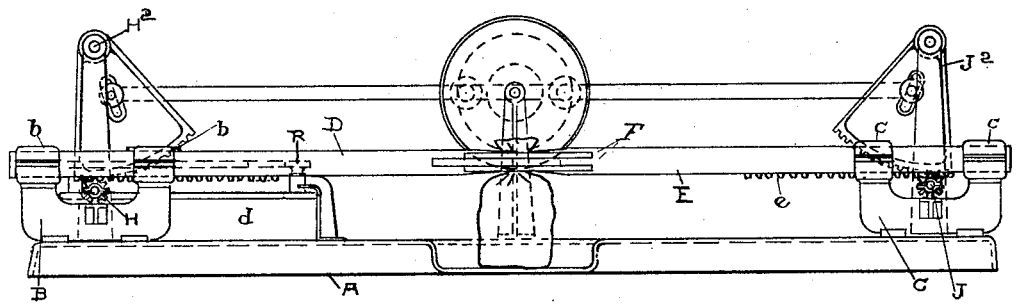

My invention relates to bag tying mechanism, and the object of my invention is to provide a machine for automatically crimping or folding the neck of a bag, and at the same time passing a wire or other suitable tie-piece about the same, and fastening it, together with such other elements and combinations as are hereinafter set forth and claimed. I attain this object by means of the mechanism illustrated in the accompanying drawings, in which:

Figure 1 is a plan. Fig. 2 is a side elevation. Fig. 3 an end elevation. Fig. 4 a detail perspective view of one of the jaw arms. Fig. 4$^a$ is a cross section of the arm D. Fig. 5 is a plan of the jaw, F. Fig. 6 is an end view of the jaw shown in Fig. 5. Fig. 7 is a plan of the jaw, G. Fig. 8 is a side view of the jaw, G, shown in Fig. 7. Fig. 9 is a detail plan view of the plunger. Fig. 10 is a perspective view of a portion of the tie forming die placed at the junction of the prongs forming the jaw, F. Fig. 11 is a perspective view of another portion of the die. Fig. 12 is still another portion of the die. Fig. 13 is a perspective view showing the arrangement of the different portions of the die in the position it occupies when the jaws are closed. Fig. 14 is a plan of the tie-piece. Fig. 15 is a plan of the tie-piece, showing the position when threaded. Fig. 16 is a plan of the tie-piece showing the position when the tie-piece is fastened. Fig. 17 is a detail perspective view of a modified form of crank arm. Fig. 18 is a side elevation of the clutch. Fig. 19 is a front elevation of the clutch, with parts broken away. Fig. 20 is a plan view of the means for operating the plunger. Fig. 21 is a plan view of the means for operating the plunger, showing its position at the beginning of the return stroke of the plunger. Fig. 22 is a side elevation of the plunger operating mechanism shown in plan view in Fig. 21. Fig. 23 is a section of the gear wheel Q. Fig. 24 is a plan of the gear wheel Q.

Similar letters refer to similar parts throughout the several views.

For the purpose of tying a bag, it is necessary to grasp and gather tightly together the bag at its neck and hold it while a suitable wire, string or other tie is placed around the neck and secured in position. In order to accomplish this result, satisfactorily, it is necessary to provide simple and substantial mechanism, which will operate automatically and continuously. It is also desirable that the mechanism shall be operative when the bag to be tied is constructed of paper, as well as of cloth, canvas or other fabric.

In order that the machine may be adapted for tying bags of cement or other heavy substances, it is advisable to have it arranged so that the bag will not be necessarily lifted or moved during the operation of tying. And when the mechanism is used for tying bags of cement, or other finely powdered substances, the working parts of the mechanism should be so protected and constructed that they will not become clogged by the substance operated upon.

I have provided a bag tying machine which complies with the requirements above noted and thereby overcomes the difficulties heretofore experienced in tying bags, and have produced a simple, inexpensive and easily operated machine, which will tie bags of paper, as well as of cloth, canvas or other fabric, and so constructed and mounted that there is little or no danger of interruption because of disarrangement of parts or inaccessibility to the place where the bag is to be operated upon.

Referring to the drawing, upon a suitable base, A, see Fig. 2, I mount the supporting frames, B and C, each of which frames is provided with the bearings, b, c. Within the bearings, b, b, reciprocates the jaw supporting arm, D, and in like manner within the bearings, c, c, reciprocates the jaw supporting arm, E. These arms, D and E, are arranged in line, are preferably square in cross section, and are provided on their lower sides with racks, d, e, respectively. To the end of the arm, D, I secure a forked block, F', having two outwardly flaring prongs, forming one V-shaped gathering jaw F, that is adapted to engage the bag. The block, F', is secured to the arm, D, by means of suitable bolts, f, or in any suitable manner.

The arm, E, has secured to its end a block, G', which is forked having two outwardly slightly separated prongs on each side, flaring outwardly, forming the V-shaped gathering jaw, G, capable of permitting the prongs forming the jaw, F, to enter between the double pair of parallel prongs forming the jaw, G, when the supporting arms are shifted inwardly toward each other. When this occurs, the prongs of the V-shaped jaws overlap, inclose the upper portion of the bag, and tightly gather the same into a neck about which the tie is placed.

The block, G', is secured by suitable bolts, g, or in any suitable manner, to the end of the arm, E.

For the purpose of actuating the arms, D and E, and likewise the jaws, F and G, I arrange the pinions, H and J, engaging, respectively, with the racks, d and e, the pinions being mounted upon shafts, H' and J', respectively. The shafts H' and J' are provided respectively with pinions h and j, with which toothed segments $H^2$, $J^2$, respectively engage. Said segments being connected by the rods, L and L', respectively, to disk crank, M, which is fixed upon the shaft 30 which is in line with a shaft 26 to which is fixed the power pulley, N. The disk crank M comprises a set of three disks connected by a pair of crank pins with which the inner ends of the connecting rods L' engage, as clearly shown in Figs. 1 and 2.

I cause the jaws to work by the operation of a clutch mounted in connection with the shafts 26 and 30 carrying the power pulley, N, and the disk crank, M, respectively, which will be hereinafter more particularly described. Indeed I do not want to limit myself to the manner of connecting the arms, D and E, with rack and pinion, or the means described for setting the said rack and pinion in motion. Other convenient means for accomplishing this result may be used, since all that is necessary is to relatively shift the arms carrying the jaws, so as to cause them to approach each other, intermesh and separate alternately.

For the purpose of tying a bag after it has been grasped by the jaws at the neck and held tightly together, I have provided a wire tie-piece, O, Fig. 14, having at one end a loop, O', which I place through an opening, D', Fig. 4 in the arm, D, where it will occupy a position in a groove, $D^2$, in said arm in the line of movement of the plunger, P, see Fig. 9. The plunger, P, being secured near one end to the reciprocating bar, P', carrying the rack, $P^2$. The reciprocating bar, P', is preferably provided with a tongue (see Fig. 9) that fits within the dovetailed groove, p, in arm, D, see Fig. 4.

The end of the plunger, P, is preferably slotted as at p'. The rack, $P^2$, carried by the reciprocating bar, P', projects from the side of the arm, D, where it engages with a gear wheel, Q, see Figs. 3 and 4, and when set in motion by the pinion, R, on the shaft, r, will move the plunger forward toward the jaw, F, and cause the tie-piece, O, with which the ends of the plunger engages to be forced forward through the groove, $D^2$, which groove is continued through the block, F', as shown in Fig. 5.

In order to provide for the proper arrangement of this groove carrying the tie-piece and the engagement of the tie-piece with the bag, I place at the junction of the prongs forming the jaw piece, F, a block, S, formed of two pieces shown in Figs. 10 and 12 within one piece of which there is an opening or chamber S' as shown in Fig. 10. The other part of the block, S, also contains a groove, $D^3$, around the semi-circular opening which forms the side of the block toward the engaging jaw, G, Fig. 7. The groove D extends through the abutting edges of the sections of block S and opens into the chamber S' and into the groove $D^3$. The jaw, G, has a block, T, at the junction of the jaw, which contains a groove, $D^4$, on the inner semi-circular face, see Fig. 11, which forms a continuation of the groove, $D^2$ and $D^3$, when the jaws are brought together. It should be noted that the groove $D^2$ is diamond shaped in cross section, as seen in Fig. $4^a$, and is tangential to the grooves $D^3$ and $D^4$.

The inner working faces of the V-shaped jaws F and G that act on the material of the bag to gather it into a neck are inclined to the direction of movement of the jaws, preferably at an angle of about forty-five degrees, and the faces of the prongs of each jaw are preferably at an angle of ninety degrees to each other. The blocks S and T are arranged at the junctures of the prongs of the jaws, and abut in closed position to constitute a closed neck-forming and tie-shaping die, as shown in Fig. 13, that snugly embraces the neck of the bag, and is arranged to shape or guide the wire tie-piece O about the neck of the bag at the point where the material is most tightly held. When the jaws are closed, and the block sections S and T are brought into engagement, the plunger P is moved inward and pushes the tie-piece O into the continuous circular grooves $D^3$ and $D^4$ in the faces of the abutting blocks. As the tie-piece is forced forward, it will pass through the groove, $D^2$, into the groove, $D^4$, and because of the substantially circular contour of the passage-way, which forms the groove, D⁴, will be bent and caused to traverse a substantially circular path, and entering the groove, D³, continuing its circular course the end of the tie will enter the chamber, S', but just as it is about to pass into the chamber, S', the loop, O', on the end of the tie-piece is emerging from the groove, D², and the forward end of the tie-piece will pass through said loop, as shown in Fig. 15. As the plunger still continues to force the tie-piece forward the end of the loop will engage the tie-piece near its forward end and cause a bend to take place therein, because the end of the tie-piece has entered and engaged with the wall of said chamber, its passage forward being prevented, and thus will be bent over upon itself, as is indicated in Fig. 16, the entire complete movement, however, of the plunger not being shown in said figure, and therefore the final position of the end of the tie-piece is not illustrated therein. Upon the complete movement of the plunger, the end of the tie-piece is bent well back upon itself, the parts thereof entering the notch $p'$ of the plunger P. The recess D² is diamond shaped in cross section, so that the tie-piece is held therein with its eye O' vertical to insure the proper threading of the opposite end of said tie-piece therethrough.

For the purpose of communicating motion to the plunger I arrange a gear wheel, Q, preferably mounted as shown in Figs. 20 and 21 on an arm, $q$, pivoted to the arm, D, permitting, therefore, of a longitudinal movement of the gear wheel. The gear wheel, Q, is adapted to engage with the rack, P², and as the arm, D, is moved, as indicated by the arrow in Fig. 20, the pinion, Q', engaging with the gear wheel, Q, will move the arm, $q$, to the position shown in Fig. 21, when the gear wheel is brought into engagement with rack, P², which is then forced backward in the direction indicated by the arrow. The pinions Q' and R are operated in opposite directions, so that when the gear wheel, Q, engages the pinion R the plunger is projected forward toward the jaws, the jaws being closed. When the jaws begin to open the gear wheel, Q, breaks connection with the pinion, R, and soon makes connection with the pinion, Q', which moving in a direction opposite to that of the pinion, R, will set the gear wheel, Q, in reverse motion, tending to withdraw the plunger. I have shown the pinions, Q' and R, mounted upon vertical shafts, respectively, connected by the cross belt, U. The end of one of the shafts, $r$, carrying the power pulley, which is connected by the belt, V, to a pulley, V', fixed on the drive shaft 26 as shown in Figs. 1 and 3. I do not wish, however, to limit myself to this means of connecting the operating mechanism for the movement of the plunger, any suitable mechanism for providing for the movement of the plunger alternately forward and back, timed upon the meeting and separation of the jaws, will come within the spirit of my invention.

In order that the gear wheel, Q, shall intermesh readily with the pinion, Q', and pinion, R, respectively, I have provided a spring, $q'$, with a roller at one end. Said spring and roller, preferably, enveloping a portion of the periphery of the gear wheel in such manner that it tends to prevent the gear wheel from spinning after separating from the pinions Q' and R, thus facilitating the ready meshing with the rack, P², at the point of engagement. I have also constructed the gear wheel, Q, in the manner illustrated in Fig. 23, so as to provide for the impact occasioned by its engagement with the pinions, Q' and R. Thus I have placed a bushing of resilient material, preferably rubber, W, within the hub of the wheel, separating that portion carrying the teeth from the brass thimble, W', engaging the shaft. Of course I do not limit myself to the use of the pinion constructed in this manner, as any pinion might be used in its place, but I prefer my improved pinion for the reasons specified.

As I have stated the gear wheel, Q, is mounted upon the pivoted arm, $q$, allowing for a slight longitudinal movement of the pinion. This is for the purpose of enabling the gear wheel, Q, to engage the rack, P², when it contacts with the pinions Q' and R. When the arm D is moved forward it carries with it the gear wheel Q until the latter engages the pinion R. The wheel Q and arm $q$ are then swung backwardly, and the wheel engages the rack P². The jaws are then closed, and the pinion R and gear wheel Q act to force the rack P² and plunger P farther in a forward direction and place the tie about the neck of the bag, as described. At the end of the forward movement of the plunger, the rack P² will move out of engagement with the gear wheel R. When the arm D moves back, the gear wheel Q, rack P² and plunger P move back with it until the gear wheel contacts with the pinion Q', when it is then swung with the arm $q$, and rotated to further withdraw the rack P² and plunger connected to the rack.

I have referred to a clutch adapted to be placed upon the drive shaft, and I now proceed to explain its construction and operation.

It will be apparent that the movement of the jaws forward and back provides for the closing of the sack and bag, and the separation of the folding device therefrom would require a complete revolution of the disk crank, M. But the power shaft 26 is running continuously and it is, therefore, advisable to arrange a clutch device, whereby the movement of the jaws may be controlled. To do this I have shown in Figs. 18 and 19 one form in which the disk, 25, fixed to the power shaft, 26, carries a projecting catch, 27, upon one side adapted to engage the end of the dog, 28, pivoted securely to a disk, 29, and which disk, 29, is keyed to a shaft, 30, that carries the crank disk, M. It will be seen that with the revolution of the disk, 25, when the projection, 27, thereon, is in engagement with the dog, 28, the disk crank, M, will be rotated.

For the purpose of breaking connection between the dog, 28, and the catch, 27, I provide a finger, 31, capable of being forced into the path of the movement of the dog, 28, and to break connection between the dog, 28, and the catch, 27. This will permit the rotation of the disk, 27, without movement of the disk, 29, and therefore prevent the rotation of the crank disk, M. It is, of course, necessary in order to allow the finger, 31, to press the dog, 28, out of engagement with the catch, 27, that there should be room within the disk to permit the dog to be thus moved, and I have shown in Fig. 19 a recess, 32, within which the dog may enter. For the purpose of forcing the dog out of the recess, 32, and placing it within the path of the movement of the catch, 27, I have a spring, 33, suitably seated and connected. The pulleys N and V, and the clutch member 25 rotate continuously with the power shaft 26. The clutch member 29 and crank disk M of the shaft 30 are normally stationary with the clutch dog 28 held in the recess 32 by the finger 31. When the finger is withdrawn the dog 28 is forced outwardly by the spring 33 into engagement with the shoulder 27 and the clutch member 25. Shaft 30 and the part carried thereby are then rotated to a single revolution or until the dog 28 is again engaged by the finger 31 and moved thereby inwardly into the recess 32. To move the finger, 31, I may arrange a suitable pedal or other device, not shown, which will readily suggest itself to any mechanic.

I have described the disk crank, M, being connected by the rod, L, L', with the segments, $H^2$, $J^2$. I show in Fig. 17 a crank arm, 34, which is a well known equivalent for the crank disk, M, and which may be substituted for the crank disk, M, if desired. It being understood that I do not wish to confine myself to the particular means described or illustrated for communicating motion to the parts of the mechanism.

On each of the prongs forming the jaw, G, near the block, T, I preferably place a projecting lug guard, K, for the purpose of preventing the bag from crowding into the groove $D^4$ of the block T and thus obstructing the passage of the tie-piece, O.

The guard lugs K prevent the material of the bag from being caught between the abutting die-forming blocks S and T, which would prevent the proper passage of the tie-piece through the grooves $D^3$ and $D^4$ and around the neck of the bag.

What I claim as my invention and desire to secure by Letters Patent is:

1. In mechanism for tying bags, the combination of two oppositely disposed forked jaws adapted to engage the neck of a bag; a means for causing said jaws to approach each other and grasp and tightly close a bag at the neck and hold it until tied and then separate; one of said jaws being arranged to carry a tie-piece; and means for projecting the tie-piece forward of its retaining jaw and causing it to traverse a path in that portion of the jaws engaging the bag when the jaws are closed, thus surrounding the neck of the bag; with a means for uniting the ends of said tie-piece.

2. In mechanism for tying bags, the combination of two oppositely disposed forked jaws; a means for causing said jaws to close; one of said jaws being arranged to carry a tie-piece provided with a loop at one end; a die placed at the junction of the forked projections forming each of said jaws, respectively, carrying a groove, so placed that when the jaws are closed there will be a continuous curved passageway formed by said groove around the intersecting portions of the jaws; and means for projecting the tie-piece from the jaw carrying same and causing it to traverse said curved passageway, and uniting the ends of said tie-piece.

3. In mechanism for tying bags, the combination of two oppositely disposed forked jaws; a plunger carrier by one of said jaws; a means for causing said plunger to reciprocate; said jaw being arranged to carry a tie-piece, in the path of the movement of said plunger; said jaws having a circular passageway formed at their intersecting portions, for receiving the tie-piece and causing the same to traverse a circular path under the influence of the movement of said plunger; and means for securing the ends of said tie-piece.

4. In mechanism for tying bags, the combination of two oppositely disposed forked jaws; arms carrying said jaws, respectively; one of said arms recessed to receive a tie-piece and a plunger; a plunger; a rack connected with said plunger; a means for imparting reciprocating motion to said rack and plunger to force the tie-piece around the neck of the bag; and means for causing said jaws to intermesh and separate, substantially as described.

5. In mechanism for tying bags, the combination of two oppositely disposed forked jaws; arms carrying said jaws, respectively; each of said arms provided with a rack; a pinion meshing with each of said racks; a means for imparting motion to said pinions, whereby said jaws will be moved to and from each other; one of said arms provided with a recess and slot; a plunger adapted to reciprocate in said recess; a rack attached to said plunger adapted to reciprocate in said slot; a gear; and a pivoted arm carrying said gear; said gear adapted to mesh with a rack attached to said plunger; two pinions mounted and connected up to rotate in opposite directions; said pinions placed in the path of the movement of said gear, substantially as described.

6. In mechanism for tying bags, the combination of two oppositely disposed forked jaws; arms carrying said jaws, respectively; one of said arms provided with a recess and slot; a plunger adapted to reciprocate in said recess; a rack attached to said plunger adapted to reciprocate in said slot; a gear; a bushing of resilient material placed in the hub of said gear; said gear pivotally mounted to the side of said arm and adapted to mesh with said rack; a means for preventing the gear from spinning when running free; two pinions mounted in the path of the movement of said gear; and means for causing said pinions to rotate in opposite directions; a means for imparting reciprocating motion to arms carrying said jaws, substantially as described.

7. In mechanism for tying bags, the combination of two oppositely disposed forked jaws; arms carrying said jaws, respectively; one of said arms being arranged to carry a tie-piece; a plunger adapted to reciprocate in said arm that carries the tie-piece; a rack connected with said plunger; a gear adapted to mesh with said rack; said gear supported by said arm; pinions mounted in the path of said gear when moved by the reciprocation of said arms; and means for causing said pinions to rotate in opposite directions, substantially as described.

8. In mechanism for tying bags, the combination of two oppositely disposed forked jaws, adapted to engage the neck of a bag; a means for causing said jaws to approach each other and grasp and tightly hold closed a bag at the neck, and hold it until tied, and then separate; a plunger adapted to force a tie-piece around the neck of a bag when held by said jaws; a rack connected with said plunger; a gear meshing with said rack; and means for operating said gear in opposite directions for the purpose of reciprocating said plunger.

9. In mechanism for tying bags, the combination of two oppositely disposed forked jaws adapted to engage the neck of a bag; arms carrying said jaws; racks on said arms; pinions meshing with said racks; segments adapted to operate said pinions; rods connecting said segments with a disk crank; a disk crank; a drive shaft; and a clutch on said drive shaft connected with said disk crank.

10. In mechanism for tying bags, jaws for engaging the neck of a bag; one of said jaws having a recess therein adapted to receive a wire tie-piece having a loop at one end; a plunger adapted to reciprocate in said recess and force forward the tie-piece; and means for imparting reciprocating motion to said plunger, substantially as described.

11. In mechanism for tying bags, a sectional tie-forming die, each section of which is provided with a groove, and one of which contains a recess; said grooves forming when the sections are brought together, a circular passageway connected with said recess; one of said sections having a groove substantially tangent to said circular passage; and means for forcing a tie-piece having a loop at one end through said tangential groove, about said circular passageway, through the loop at the end of the tie-piece, into said recess, bending the end of the tie-piece over the end of the loop, substantially as described.

12. In bagging machines, the combination of a pair of jaws movable together and apart, said jaws having gathering prongs arranged to overlap in closed position and portions at the juncture of said prongs arranged to abut in closed position and form a closed die for engaging the neck of the bag, and means for passing a tie piece around the neck of the bag.

13. In bagging machines, the combination of a pair of jaws movable together and apart, one of said jaws comprising two pairs of gathering prongs and the other a single pair of gathering prongs movable between said double pair of prongs, and means for placing a tie around the neck of the bag.

14. In bagging machines, the combination of a pair of jaws movable together and apart, one of said jaws comprising a double pair of gathering prongs and the other of said jaws a single pair of gathering prongs movable between said double pair of prongs, said jaws having portions at the juncture of said gathering prongs arranged to abut in closed position to form a die for engaging the neck of the bag, and means for placing a tie around the neck of the bag.

15. In bagging machines, the combination of a pair of jaws movable together and apart, said jaws comprising pairs of gathering prongs arranged to overlap in closed position and having portions at the juncture of said prongs arranged to abut in closed position to form a die for engaging the neck of the bag, mechanism for reciprocating said jaws, a clutch for intermittently throwing said mechanism into operation, and devices operated by said mechanism for placing a tie around the neck of the bag.

16. In bagging machines, the combination of means for forming a closed die around the neck of the bag, and means for forcing a tie piece longitudinally around the neck of the bag between the face of said die and the material of the bag engaged thereby.

17. In bagging machines, the combination of means for forming a closed die around the neck of the bag with a continuous groove in the face of said die, and means for forcing a tie piece longitudinally through said groove and for connecting the ends thereof.

18. In bagging machines, the combination with a pair of jaws movable together and apart, said jaws having grooved portions arranged to abut in closed position to form a closed die about the neck of the bag with a continuous groove in its face, and means movable through one of said jaws for forcing a tie piece longitudinally through said groove.

19. In bagging machines, the combination of a pair of jaws movable together and apart and having grooved portions arranged to abut in closed position to form a closed die around the neck of the bag with a continuous groove in the face of said die, and a plunger carried by one of said jaws for forcing a tie piece through said groove said plunger being mounted in a guide-way tangential to the groove of said die.

20. In bagging machines, the combination of a pair of jaws comprising pairs of gathering prongs arranged to overlap in closed position and having portions at the juncture of said jaws arranged to abut in closed position to form a closed die around the neck of the bag, and a plunger for forcing a tie piece longitudinally around the neck of the bag and between the material thereof and the face of said die.

21. In bagging machines, the combination of a pair of jaws movable together and apart, said jaws comprising pairs of gathering prongs arranged to overlap in closed position and having grooved portions arranged to abut in closed position to form a closed die around the neck of the bag, and a plunger movable through one of said jaws for forcing a tie piece longitudinally through the groove of said abutting portions and for connecting the ends thereof.

22. In bagging machines, the combination of a pair of jaws movable together and apart, one of said jaws comprising a double pair of gathering prongs and the other of said jaws a single pair of gathering prongs movable between said double pair of prongs, said jaws having grooved portions at the juncture of said prongs arranged to abut in closed position to form a closed die with a groove in its face, and a plunger carried by one of said jaws for forcing a tie piece longitudinally through said groove and around the neck of the bag.

23. In bagging machines, the combination of jaws for forming the neck of the bag, tie guiding devices adapted to embrace the formed neck of the bag, and means for forcing a tie piece around the embraced portion of the neck of the bag and for threading one end of the tie through an eye in its opposite end.

24. In bagging machines, the combination of a die adapted to extend around the neck of the bag and provided with a groove in its face, and means for forcing a tie piece longitudinally through said groove and for threading one end of said tie through an eye in its opposite end.

25. In bagging machines, the combination of a pair of jaws movable together and apart and having portions arranged to abut in closed position to form a closed die around the neck of the bag with a groove in the face of said die, and means movable through one of said jaws for forcing a tie piece longitudinally through the groove of said die and for threading one end of the tie through and hooking it over an eye in its opposite end.

26. In bagging machines, the combination with a pair of jaws movable together and apart, said jaws comprising pairs of gathering prongs arranged to overlap in closed position and having portions at the juncture of said prongs arranged to abut in closed position to form a closed die around the neck of the bag with a continuous groove in the face of said die, and a plunger movable through one of said jaws for forcing a tie piece longitudinally through the groove of said die and for threading one end thereof through and hooking it over an eye in its opposite end.

27. In a bag tying mechanism, the combination of a pair of opposed V-shaped jaws relatively movable together and apart and comprising pairs of oppositely inclined gathering prongs arranged to initially overlap in closing to embrace the upper portion of the bag and then fold and compress the same into a neck, and means for placing a tie about the neck thus formed.

28. In a bag tying mechanism, the combination of a pair of opposed V-shaped jaws relatively movable together and apart and comprising pairs of oppositely inclined gathering prongs of substantially equal dimensions arranged to initially overlap in closing to embrace the upper portion of the bag and then fold and compress the same into a neck, and means for placing a tie about the neck thus formed.

29. In a bag tying mechanism, the combination of a pair of opposed jaws relatively movable in a right line together and apart and comprising pairs of oppositely inclined prongs having working faces inclined to the path of movement and arranged to initially overlap in closing to embrace the upper portion of the bag and then fold and compress the same into a neck, and means for placing a tie about the neck thus formed.

30. In a bag tying mechanism, the combination with a pair of neck forming jaws movable together and apart and having portions arranged to abut in closed position to form a closed die about the neck of the bag, and a plunger movable through one of said jaws for forcing a tie piece through said die and about the neck of the bag and for threading one end of the tie piece through an eye in its opposite end, the end of said plunger being slotted to permit the threaded end of said tie piece to be folded back upon itself upon the complete movement of the plunger.

31. In a bag tying mechanism, the combination with a pair of neck forming jaws movable together and apart and having portions arranged to abut in closed position to form a closed die about the neck of the bag, a plunger movable through one of said jaws, and means for thrusting said plunger inwardly after the jaws are closed to force a tie piece through said die and about the neck of the bag and for threading one end of said tie piece through an eye in its opposite end, the end of said plunger being slotted to permit the threaded end of said tie piece to be folded back upon itself upon the complete movement of the plunger.

32. In a bag tying mechanism, the combination with a pair of neck forming jaws movable together and apart and having portions arranged to abut in closed position to form a closed die about the neck of the bag, one of said jaws having a diamond-shaped recess therein to receive a looped tie piece and retain it with its loop or eye in a predetermined position, and a plunger movable through said recessed jaw for forcing the tie piece through said die and about the neck of the bag and for threading an end of the tie piece through the loop or eye in its opposite end.

33. In a bag tying mechanism, the combination of neck forming jaws having portions arranged to abut in closed position to form a closed die about the neck of the bag, and means for forcing a tie piece through the die and around the neck of the bag, said jaws having guard lugs to prevent the entrance of the material of the bag between the abutting die forming portions.

In testimony whereof I have affixed my signature in presence of two witnesses.

JOSEPH HENRY RAMSEY.

Witnesses:
FREDERICK W. CAMERON,
LOTTIE PRIOR.

---

Copies of this patent may be obtained for five cents each, by addressing the "Commissioner of Patents, Washington, D. C."